US012651702B2

(12) United States Patent (10) Patent No.: US 12,651,702 B2
Baba (45) Date of Patent: Jun. 9, 2026

(54) MULTILAYER CERAMIC CAPACITOR

(71) Applicant: Murata Manufacturing Co., Ltd., Nagaokakyo (JP)

(72) Inventor: Takaaki Baba, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 183 days.

(21) Appl. No.: 18/755,758

(22) Filed: Jun. 27, 2024

(65) Prior Publication Data

US 2025/0014819 A1 Jan. 9, 2025

(30) Foreign Application Priority Data

Jul. 6, 2023 (JP) ................................. 2023-111476

(51) Int. Cl.
*H01G 4/008* (2006.01)
*H01G 4/12* (2006.01)
*H01G 4/232* (2006.01)
*H01G 4/30* (2006.01)

(52) U.S. Cl.
CPC ......... *H01G 4/0085* (2013.01); *H01G 4/1227* (2013.01); *H01G 4/232* (2013.01); *H01G 4/30* (2013.01)

(58) Field of Classification Search
CPC .... H01G 4/0085; H01G 4/1227; H01G 4/232; H01G 4/30
See application file for complete search history.

(56) References Cited

U.S. PATENT DOCUMENTS

| | | | | |
|---|---|---|---|---|
| 9,613,755 | B2 * | 4/2017 | Oh | H01G 4/008 |
| 2012/0307418 | A1 * | 12/2012 | Kim | H01G 4/012 |
| | | | | 361/321.2 |
| 2014/0168849 | A1 * | 6/2014 | Lee | H01G 4/12 |
| | | | | 361/301.4 |
| 2015/0075854 | A1 * | 3/2015 | You | H01G 4/35 |
| | | | | 361/275.1 |
| 2015/0318109 | A1 * | 11/2015 | Lee | H01G 4/0085 |
| | | | | 156/89.16 |
| 2016/0133384 | A1 * | 5/2016 | Park | H01G 4/232 |
| | | | | 361/301.4 |
| 2016/0225527 | A1 * | 8/2016 | Kawamoto | H01B 3/12 |
| 2019/0279824 | A1 * | 9/2019 | Sim | H01G 4/232 |
| 2020/0043666 | A1 * | 2/2020 | Kim | H01G 4/30 |
| 2022/0068561 | A1 * | 3/2022 | Sasaki | H01G 4/0085 |

FOREIGN PATENT DOCUMENTS

JP 2018-182106 A 11/2018

* cited by examiner

*Primary Examiner* — Michael P Mcfadden
(74) *Attorney, Agent, or Firm* — Keating & Bennett, LLP

(57) ABSTRACT

A multilayer ceramic capacitor includes a laminate including dielectric layers and internal electrode layers, first and second main surfaces, first and second side surfaces, and first and second end surfaces, and external electrodes covering the first and second end surfaces, respectively, and connected to the internal electrode layers. The internal electrode layers are divided into M groups each including N internal electrode layers. A total number of internal electrode layers included in the first to M-th groups is 1,000 or more. A thickness of the dielectric layer is about 0.8 µm or more. In at least one set of an m-th group and an (m+1)-th group, a deviation amount $\alpha 1$ is less than a deviation amount $\beta 1$. In the m-th group and the (m+1)-th group, a deviation amount $\alpha 2$ is less than a deviation amount $\beta 2$.

20 Claims, 4 Drawing Sheets

MULTILAYER CERAMIC CAPACITOR

CROSS REFERENCE TO RELATED APPLICATIONS

This application claims the benefit of priority to Japanese Patent Application No. 2023-111476 filed on Jul. 6, 2023. The entire contents of this application are hereby incorporated herein by reference.

BACKGROUND OF THE INVENTION

1. Field of the Invention

The present invention relates to multilayer ceramic capacitors.

2. Description of the Related Art

Conventionally, there has been known a multilayer ceramic capacitor including a laminate in which a plurality of dielectric layers and a plurality of internal electrode layers are laminated in a lamination direction, and a pair of external electrodes disposed at both end portions in a length direction of the laminate and connected to the internal electrode layers.

JP 2018-182106 A discloses a multilayer ceramic capacitor including a laminated chip, in which dielectric layers including ceramic as a main component and internal electrode layers are alternately laminated, and the laminated internal electrode layers are formed so as to be exposed on two end surfaces alternately facing each other, and which has a substantially rectangular parallelepiped shape, and external electrodes formed on the two end surfaces, the external electrode having a structure in which a plating layer is formed on a base layer, and at least a part of a surface of the base layer including a region in which a mean spacing of local peaks is 0.5 μm or less in a region in which a height from a bottom to a peak is 0.4 μm or more.

In recent years, multilayer ceramic capacitors have been increasing in capacitance, and have a structure in which a large number of internal electrode layers are laminated. JP 2018-182106 A describes that in examples, 1,000 dielectric green sheets on which a conductive paste for forming an internal electrode is printed are laminated, and a cover sheet made of a material whose main component is the same as that of the dielectric green sheets is laminated above and below the dielectric green sheets.

However, in a method of laminating 1,000 or more dielectric green sheets at a time, if a defect occurs at any one place, it is necessary to newly laminate 1,000 or more dielectric green sheets. Therefore, there is a problem that the productivity of the multilayer ceramic capacitor is significantly reduced.

SUMMARY OF INVENTION

Example embodiments of the present invention provide multilayer ceramic capacitors with excellent productivity.

A multilayer ceramic capacitor according to an example embodiment of the present invention includes a laminate including a plurality of dielectric layers and a plurality of internal electrode layers laminated in a lamination direction, a first main surface and a second main surface facing each other in the lamination direction, a first side surface and a second side surface facing each other in a width direction orthogonal or substantially orthogonal to the lamination direction, and a first end surface and a second end surface facing each other in a length direction orthogonal or substantially orthogonal to the lamination direction and the width direction, and a pair of external electrodes covering the first end surface and the second end surface of the laminate, respectively, and connected to the internal electrode layers. The plurality of internal electrode layers are divided into M (M is a natural number of 2 or more) groups. The M groups each independently include N (N is a natural number of 2 or more) internal electrode layers continuously in the lamination direction. A total number of internal electrode layers included in the first to M-th groups is 1,000 or more. A thickness of the dielectric layer is about 0.8 μm or more. When a cross section including the width direction and the lamination direction at a central portion in the length direction in the laminate is viewed, in at least one set of the m-th (m is a natural number of 1 or more and M−1 or less) group and the (m+1)-th group, a deviation amount in the width direction between the n-th (n is a natural number of 1 or more and N−1 or less) internal electrode layer and the (n+1)-th internal electrode layer is within $\alpha 1$, and when a deviation amount in the width direction of the internal electrode layers adjacent to each other in the lamination direction between the m-th group and the (m+1)-th group is denoted by $\beta 1$, $\alpha 1 < \beta 1$ is satisfied. When a cross section including the length direction and the lamination direction at a central portion in the width direction in the laminate is viewed, in the m-th group and the (m+1)-th group, the deviation amount in the length direction of the end portions not connected to the external electrode of the internal electrode layers connected to the same external electrode is within $\alpha 2$, and when the deviation amount in the length direction of the end portions not connected to the external electrode of the internal electrode layers closest to each other and connected to the same external electrode between the m-th group and the (m+1)-th group is denoted by $\beta 2$, $\alpha 2 < \beta 2$ is satisfied.

According example embodiments of the present invention, multilayer ceramic capacitors with excellent productivity are provided.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

Figure 1:
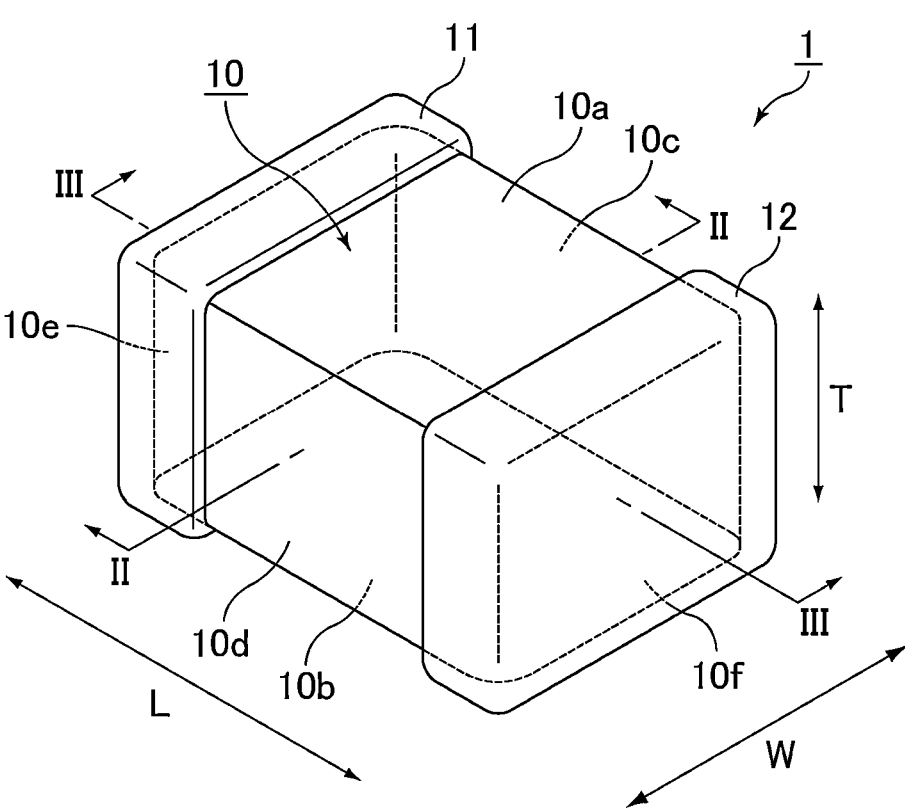
FIG. 1 is a perspective view schematically showing an example of a multilayer ceramic capacitor according to an example embodiment of the present invention.

Hereinafter, multilayer ceramic capacitors according to example embodiments of the present invention will be described with reference to the drawings. The present invention is not limited to the following example embodiments, and can be appropriately modified and applied without changing the gist of the present invention. The present invention also includes a combination of two or more of individual preferable configurations described in the following example embodiments.

In the present specification, a term indicating a relationship between elements (for example, "vertical", "parallel", or "orthogonal") and a term indicating the shape of an element are not expressions indicating strict meanings only, but are expressions meaning substantially equivalent ranges, for example, including a difference by about several percent.

The drawings shown below are schematic views, and dimensions, scales of aspect ratios, and the like may be different from those of actual products. In particular, the number of internal electrode layers does not reflect an actual product. In the drawings, the same or corresponding portions are denoted by the same reference numerals. In each drawing, the same elements are denoted by the same reference numerals, and redundant description will be omitted.

FIG. 1 is a perspective view schematically showing an example of a multilayer ceramic capacitor according to an example embodiment of the present invention.

A multilayer ceramic capacitor 1 shown in FIG. 1 includes a laminate 10 and a pair of external electrodes 11 and 12. In the multilayer ceramic capacitor 1 and the laminate 10, the length direction, the width direction, and the lamination direction are directions defined by double-headed arrows L, W, and T, respectively.

Laminate

The laminate 10 includes a first main surface 10a and a second main surface 10b facing each other in a lamination direction T, a first side surface 10c and a second side surface 10d facing each other in a width direction W orthogonal to the lamination direction T, and a first end surface 10e and a second end surface 10f facing each other in a length direction L orthogonal to the lamination direction T and the width direction W. The laminate 10 has, for example, a rectangular parallelepiped shape.

At least one of a corner portion or a ridge portion of the laminate 10 may be rounded. Here, the corner portion is a portion where three surfaces of the laminate 10 intersect, and the ridge portion is a portion where two surfaces of the laminate 10 intersect.

Figure 2:
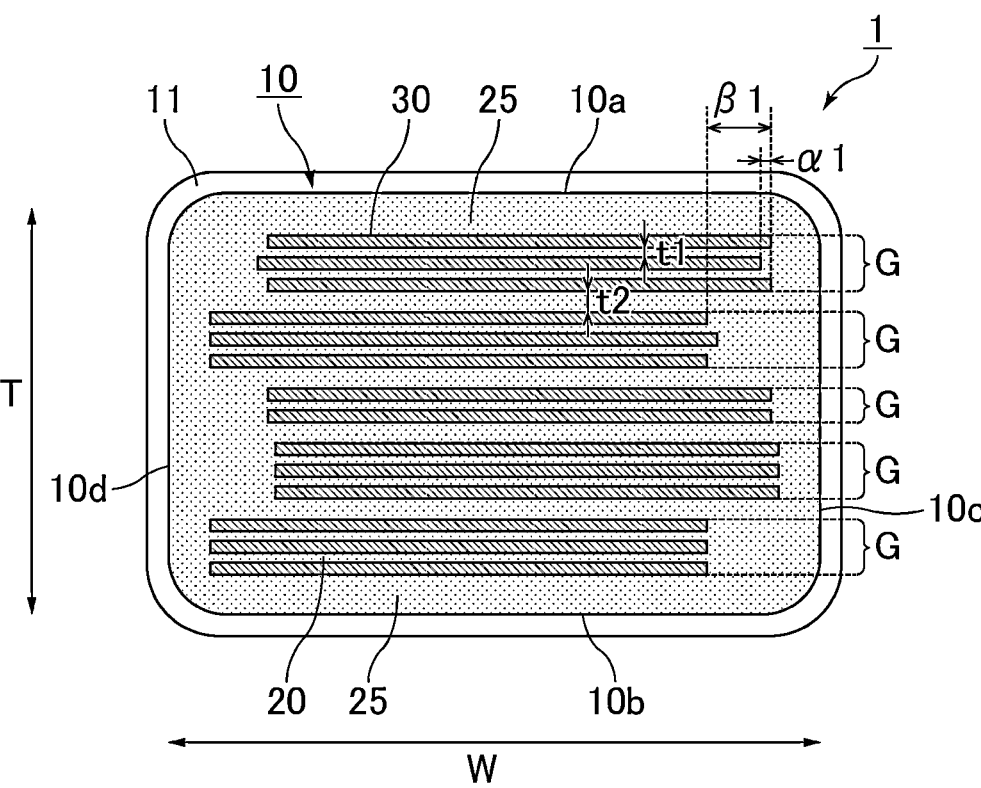
FIG. 2 is an example of a WT cross-sectional view including a width direction W and a lamination direction T along the line II-II of the multilayer ceramic capacitor shown in FIG. 1.
Figure 3:
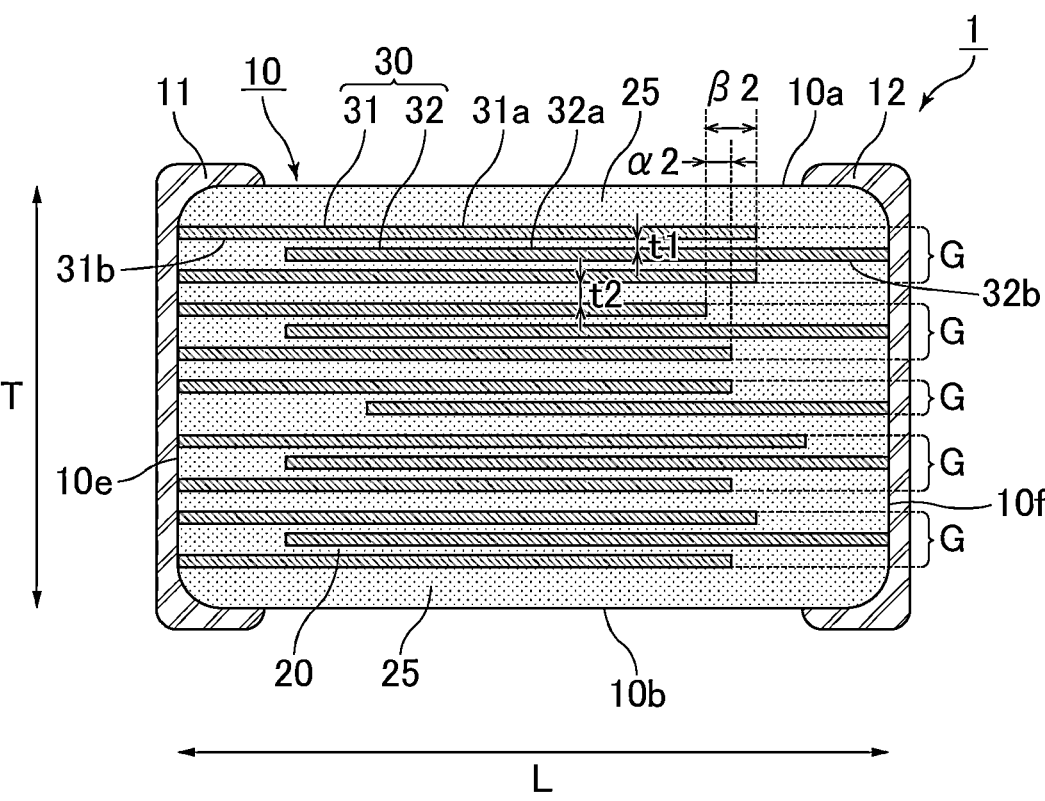
FIG. 3 is an example of an LT cross-sectional view including a length direction L and a lamination direction T along a line III-III of the multilayer ceramic capacitor shown in FIG. 1.

FIG. 2 is an example of a WT cross-sectional view including a width direction W and a lamination direction T along the line II-II of the multilayer ceramic capacitor shown in FIG. 1. FIG. 3 is an example of an LT cross-sectional view including a length direction L and a lamination direction T along a line III-III of the multilayer ceramic capacitor shown in FIG. 1.

The laminate 10 includes a plurality of dielectric layers 20 and a plurality of internal electrode layers 30 laminated in the lamination direction T.

The number of dielectric layers 20 is, for example, 1,000 or more.

As the dielectric material of the dielectric layer 20, for example, a dielectric ceramic including a component such as $BaTiO_3$ or $SrTiO_3$ as a main component is used. A component whose content is smaller than the main component, such as, for example, a Mn compound, an Fe compound, a Cr compound, a Co compound, or a Ni compound, may be added to the main component.

The thickness of the dielectric layer 20 between the internal electrode layers 30 is, for example, about 0.8 μm or more. Meanwhile, the thickness of the dielectric layer 20 between the internal electrode layers 30 is, for example, about 1.2 μm or less.

An outer layer portion 25 formed by laminating only the dielectric layer 20 may be provided outside the plurality of dielectric layers 20 and the plurality of internal electrode layers 30 laminated in the lamination direction T. The outer layer portion 25 is a dielectric layer located on both main surface sides of the laminate 10 and located between the main surface and the internal electrode layer 30 closest to the main surface. Meanwhile, a region sandwiched between both outer layer portions 25 can also be referred to as an inner layer portion.

The thickness of the outer layer portion 25 is, for example, preferably about 30 μm or more and about 200 μm or less.

As shown in FIG. 3, the plurality of internal electrode layers 30 include a first internal electrode layer 31 and a second internal electrode layer 32.

The first internal electrode layer 31 includes a first counter electrode portion 31a facing the second internal electrode layer 32 via the dielectric layer 20, and a first extraction electrode portion 31b extending from the first counter electrode portion 31a to the first end surface 10e of the laminate 10.

The second internal electrode layer 32 includes a second counter electrode portion 32a facing the first internal electrode layer 31 via the dielectric layer 20, and a second extraction electrode portion 32b extending from the second counter electrode portion 32a to the second end surface 10f of the laminate 10.

In the laminate 10, W gaps are provided between one end in the width direction W of the first counter electrode portion 31a or the second counter electrode portion 32a and the first side surface 10c, and between the other end in the width direction W of the first counter electrode portion 31a or the second counter electrode portion 32a and the second side surface 10d. Further, in the laminate 10, L gaps are provided between the end portion of the first internal electrode layer 31 on the side opposite to the first extraction electrode portion 31b and the second end surface 10f, and between the end portion of the second internal electrode layer 32 on the side opposite to the second extraction electrode portion 32b and the first end surface 10e.

The dimension in the width direction W of the W gap of the laminate 10 is, for example, preferably about 30 μm or more and about 100 μm or less.

The dimension in the length direction L of the L gap of the laminate 10 is, for example, preferably about 30 μm or more and about 100 μm or less.

In the present example embodiment, in each counter electrode portion, the internal electrode layers 30 face each other via the dielectric layer 20, thus generating a capacitance. Thus, the multilayer ceramic capacitor 1 defines and functions as a capacitor.

As shown in FIGS. 2 and 3, the plurality of internal electrode layers 30 are divided into M (M is a natural number of 2 or more) groups G. In the example shown in FIGS. 2 and 3, the plurality of internal electrode layers 30 is divided into five groups G.

The number M of groups G may be, for example, 3 or more, 4 or more, 5 or more, or 10 or more. Meanwhile, the number M of groups G may be, for example, 100 or less, 50 or less, 40 or less, 30 or less, 25 or less, 20 or less, or 15 or less.

The M groups G each independently include N (N is a natural number of 2 or more) internal electrode layers 30 continuously in the lamination direction T. In the example shown in FIGS. 2 and 3, five groups G include three or two internal electrode layers 30 continuously in the lamination direction T.

The total number of internal electrode layers 30 included in the first to M-th groups G is, for example, 1,000 or more. Meanwhile, the total number of internal electrode layers 30 included in the first to M-th groups G may be, for example, 10,000 or less, 5,000 or less, 4,500 or less, 4,000 or less, 3,500 or less, 3,000 or less, 2,500 or less, or 2,000 or less.

Each group G preferably includes, for example, 100 or more internal electrode layers 30. That is, the number N of internal electrode layers 30 included in each group G is preferably 100 or more. Meanwhile, the number N of internal electrode layers 30 included in each group G may be, for example, 500 or less, 400 or less, 300 or less, 250 or less, 200 or less, or 150 or less.

As shown in FIG. 2, when a cross section (that is, a WT cross section) including the width direction W and the lamination direction T at a central portion in the length direction L in the laminate 10 is viewed, in at least one set of the m-th (m is a natural number of 1 or more and M−1 or less) group G and the (m+1)-th group G, a deviation amount in the width direction W between the n-th (n is a natural number of 1 or more and N−1 or less) internal electrode layer 30 and the (n+1)-th internal electrode layer 30 is within $\alpha 1$, and when a deviation amount in the width direction W of the internal electrode layers 30 adjacent to each other in the lamination direction T between the m-th group G and the (m+1)-th group G is denoted by $\beta 1$, $\alpha 1 < \beta 1$ is satisfied.

In the M groups, the above relationship may be satisfied in at least one set of groups G. Therefore, there may be a set of groups G that does not satisfy the above relationship, but it is preferable to satisfy the above relationship among all of the groups G. The same applies to the following.

In the present example embodiment, m-th and (m+1)-th laminated blocks are prepared in advance, and they are pressure-bonded later. Preferably, a dielectric sheet thicker than a dielectric sheet on which an internal electrode pattern is printed is laminated in advance on the uppermost layer and the lowermost layer of each laminated block to facilitate handling. When the multilayer ceramic capacitor 1 is produced by such a method, for example, if a defect occurs in the m-th laminated block, only the m-th laminated block needs to be laminated again, so that the productivity of the multilayer ceramic capacitor 1 is improved.

The deviation amount $\alpha 1$ in the width direction W of the internal electrode layer 30 is, for example, about 0 µm or more and about 20 µm or less. The deviation amount $\alpha 1$ in the width direction W of the internal electrode layer 30 may be the same or different between different groups G.

The deviation amount $\beta 1$ in the width direction W of the internal electrode layer 30 is, for example, about 100 µm or more and about 500 µm or less. The deviation amount 1 in the width direction W of the internal electrode layer 30 may be the same or different between different groups G.

Further, as shown in FIG. 3, when a cross section (that is, an LT cross section) including the length direction L and the lamination direction T at a central portion in the width direction W in the laminate 10 is viewed, in the m-th group G and the (m+1)-th group G, the deviation amount in the length direction L of the end portions not connected to the external electrode 11 or 12 of the internal electrode layers 30 connected to the same external electrode 11 or 12 is within $\alpha 2$, and when the deviation amount in the length direction L of the end portions not connected to the external electrode 11 or 12 of the internal electrode layers 30 closest to each other and connected to the same external electrode 11 or 12 between the m-th group G and the (m+1)-th group G is denoted by $\beta 2$, $\alpha 2 < \beta 2$ is satisfied.

The deviation amount $\alpha 2$ in the length direction L of the internal electrode layer 30 is, for example, about 0 µm or more and about 20 µm or less. The deviation amount 2 in the length direction L of the internal electrode layer 30 may be the same or different between different groups G. The deviation amount $\alpha 2$ in the length direction L of the internal electrode layer 30 may be the same as the deviation amount $\alpha 1$ in the width direction W of the internal electrode layer 30, or may be smaller than the deviation amount $\alpha 1$ in the width direction W of the internal electrode layer 30, or may be larger than the deviation amount $\alpha 1$ in the width direction W of the internal electrode layer 30.

The deviation amount $\beta 2$ in the length direction L of the internal electrode layer 30 is, for example, about 100 µm or more and about 500 µm or less. The deviation amount $\beta 2$ in the length direction L of the internal electrode layer 30 may be the same or different between different groups G. The deviation amount $\beta 2$ in the length direction L of the internal electrode layer 30 may be the same as the deviation amount $\beta 1$ in the width direction W of the internal electrode layer 30, or may be smaller than the deviation amount $\beta 1$ in the width direction W of the internal electrode layer 30, or may be larger than the deviation amount $\beta 1$ in the width direction W of the internal electrode layer 30.

As described above, the dielectric layer 20 that can be handled independently is preferably disposed in the outermost layer of each group G. Therefore, when the distance between the internal electrode layers 30 in the m-th group G is denoted by t1 and the distance between the internal electrode layers 30 in between the m-th group G and the (m+1)-th group G is denoted by t2, it is preferable to satisfy t1<t2.

The distortion in the lamination direction T due to the piezoelectric effect generated between groups G can be absorbed by increasing the thickness between the groups G, so that the reliability of the multilayer ceramic capacitor 1 is improved.

The distance t1 between the internal electrode layers 30 is, for example, about 0.8 µm or more and about 1.2 µm or less. The distance t1 between the internal electrode layers 30 may be the same or different between different groups G.

Meanwhile, the distance t2 between the internal electrode layers 30 satisfies, for example, t1<t2, and is about 1.2 µm or more and about 5 µm or less. For example, when t1=about 1.2 µm, it is preferable to satisfy t2>about 1.2 µm. The distance t2 between the internal electrode layers 30 may be the same or different between different sets of groups G.

When the number of internal electrode layers 30 included in the m-th group G is denoted by N1 and the number of internal electrode layers 30 included in the (m+1)-th group G is denoted by N2, N1 and N2 may be the same or different. As described above, the numbers of internal electrode layers 30 included in the respective groups G may all be the same, or at least some of them may be different.

When a cross section including the length direction L and the lamination direction T at a central portion in the width direction W in the laminate 10 is viewed, the internal electrode layers 30 closest to each other between the m-th group G and the (m+1)-th group G are preferably connected to the same external electrode 11 or 12. In this case, since electrostriction is less likely to occur between the m-th group G and the (m+1)-th group G, the reliability of the multilayer ceramic capacitor 1 is further improved.

In the m-th group G, at least one of an end portion in the width direction W or an end portion in the length direction L of the internal electrode layer 30 may be curved in the same direction of the lamination direction T. In this case, since the directions in which the end portions of the internal electrode layers 30 are curved are the same, the reliability of the multilayer ceramic capacitor 1 is improved.

When an end portion in the width direction W of the internal electrode layer 30 is curved, in the same internal electrode layer 30, one end portion in the width direction W may be curved, or both end portions in the width direction W may be curved. When both end portions are curved, both end portions are preferably curved in the same direction of the lamination direction T. In the same group G, the internal electrode layer 30 in which one end portion in the width direction W is curved and the internal electrode layer 30 in which both end portions in the width direction W are curved may be mixed. Further, in the same group G, the internal electrode layer 30 in which an end portion in the width direction W is curved and the internal electrode layer 30 in which an end portion in the width direction W is not curved may be mixed.

When an end portion of the internal electrode layer 30 in the length direction L is curved, an end portion not connected to the external electrode 11 or 12 may be curved. In that case, only an end portion not connected to the external electrode 11 may be curved, or only an end portion not connected to the external electrode 12 may be curved, or both end portions may be curved. When both end portions are curved, both end portions are preferably curved in the same direction of the lamination direction T. In the same group G, the internal electrode layer 30 in which an end portion in the length direction L is curved and the internal electrode layer 30 in which an end portion in the length direction L is not curved may be mixed.

Figure 4:
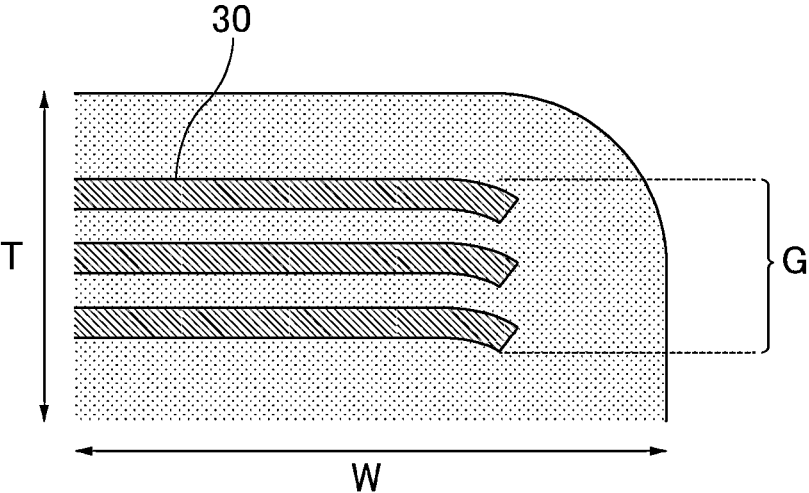
FIG. 4 is a cross-sectional view schematically showing an example of a state in which an end portion in a width direction of an internal electrode layer is curved.

FIG. 4 is a cross-sectional view schematically showing an example of a state in which an end portion in a width direction of an internal electrode layer is curved.

In the example shown in FIG. 4, the end portions in the width direction W of the internal electrode layers 30 are curved in the same direction (downward in FIG. 4) of the lamination direction T.

Figure 5:
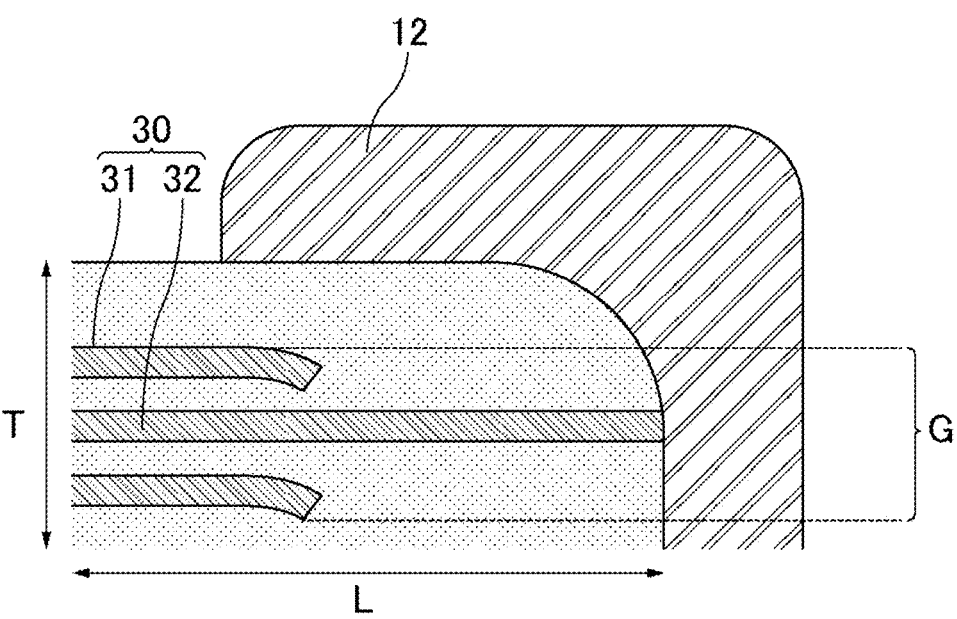
FIG. 5 is a cross-sectional view schematically showing an example of a state in which an end portion in a length direction of an internal electrode layer is curved.

FIG. 5 is a cross-sectional view schematically showing an example of a state in which an end portion in a length direction of an internal electrode layer is curved.

In the example shown in FIG. 5, the end portions in the length direction L of the internal electrode layers 30 (for example, the first internal electrode layers 31) are curved in the same direction (downward in FIG. 5) of the lamination direction T.

Although not shown in FIGS. 4 and 5, further in the (m+1)-th group G, at least one of an end portion in the width direction W or an end portion in the length direction L of the internal electrode layer 30 may be curved in the same direction of the lamination direction T.

In the above case, the directions in which the end portions of the internal electrode layers 30 are curved may be the same between the m-th group G and the (m+1)-th group G. For example, the lamination direction of the m-th laminated block and the (m+1)-th laminated block may be the same.

Alternatively, the directions in which the end portions of the internal electrode layers 30 are curved may be different between the m-th group G and the (m+1)-th group G. For example, the lamination directions of the m-th laminated block and the (m+1)-th laminated block may be different. In some cases, the distortion of the entire laminated block can be reduced by making the lamination directions of the laminated blocks different.

Among the first to M-th groups G, the directions in which the end portions of the internal electrode layers 30 are curved may be the same in all of the groups G, and the directions in which the end portions of the internal electrode layers 30 are curved may be different in at least some of the groups G. A group G in which an end portion of the internal electrode layer 30 is not curved may be included.

Various deviation amounts and curving directions can be observed and measured using an optical microscope after the laminate 10 is polished so that each cross section is exposed.

External Electrode

The pair of external electrodes 11 and 12 cover the first end surface 10e and the second end surface 10f of the laminate 10, respectively, and is connected to the internal electrode layer 30.

The external electrode 11 covers the first end surface 10e of the laminate 10, and is connected to the first internal electrode layer 31. The external electrode 11 may extend from the first end surface 10e to the first main surface 10a, the second main surface 10b, the first side surface 10c, and the second side surface 10d.

The external electrode 12 covers the second end surface 10f of the laminate 10, and is connected to the second internal electrode layer 32. The external electrode 12 may extend from the second end surface 10f to the first main surface 10a, the second main surface 10b, the first side surface 10c, and the second side surface 10d.

For example, the external electrodes 11 and 12 each include a base electrode layer and a plating layer on the base electrode layer.

The base electrode layer includes, for example, at least one layer selected from, for example, a baked layer, a resin layer, and a thin film layer.

The baked layer includes, for example, glass and a metal. The baked layer includes, for example, at least one metal selected from, for example, Cu, Ni, Ag, Pd, an Ag—Pd alloy, and Au.

The baked layer may include a plurality of layers.

The baked layer is formed by applying a conductive paste including glass and a metal to a laminate, followed by baking it. The baked layer may be formed by baking it at the same time as firing with the internal electrode layer, or may be formed by baking it after firing the internal electrode layer.

The resin layer may include, for example, a resin layer including conductive particles and a thermosetting resin. The resin layer may be provided directly on the laminate without forming a baked layer.

The resin layer may include a plurality of layers.

The thin film layer is formed by a thin film forming method such as, for example, sputtering or vapor deposition, and is a layer of, for example, about 1 μm or less obtained by depositing metal particles.

The plating layer includes, for example, at least one metal selected from, for example, Cu, Ni, Ag, Pd, an Ag—Pd alloy, and Au.

The plating layer may include a plurality of layers. The plating layer preferably has a two-layer structure of a Ni plating layer and a Sn plating layer, for example. The Ni plating layer can prevent the base electrode layer from being eroded by solder when the multilayer ceramic capacitor is mounted, and the Sn plating layer can improve the wettability of solder when the multilayer ceramic capacitor is mounted, and the multilayer ceramic capacitor can be easily mounted.

Each of the external electrodes 11 and 12 may include a plating layer directly provided on the laminate 10 and directly connected to the internal electrode layer 30. However, a catalyst may be provided on the laminate 10 as a pretreatment.

The plating layer preferably includes a first plating layer and a second plating layer provided on the first plating layer.

The first plating layer and the second plating layer preferably include, for example, plating of one metal selected from the group consisting of Cu, Ni, Sn, Pb, Au, Ag, Pd, Bi, and Zn, or plating of an alloy including at least one of the metals.

For example, when Ni is used as the internal electrode layer 30, Cu having good bondability to Ni is preferably used as the first plating layer. In addition, Sn or Au having good solder wettability is preferably used as the second plating layer, and Ni having solder barrier performance is preferably used as the first plating layer.

The second plating layer is provided as necessary, and the external electrodes 11 and 12 may be defined by the first plating layer.

The second plating layer may be provided as an outermost layer of the plating layer, and another plating layer may be provided on the second plating layer.

The plating layer preferably does not include glass.

The metal ratio per unit volume of the plating layer is, for example, preferably about 99 vol % or more.

The plating layer is formed by grain growth along the thickness direction, and preferably has a columnar shape, for example.

Internal Electrode Layer

The internal electrode layer 30 includes, for example, a metal such as Ni, Cu, Ag, Pd, an Ag—Pd alloy, or Au.

The internal electrode layer 30 may further include dielectric particles having the same composition as a ceramic contained in the dielectric layer 20.

The number of internal electrode layers 30 is, for example, preferably 1,000 or more.

The thickness of the internal electrode layer 30 is, for example, preferably about 0.8 μm or more and about 1.2 μm or less.

Multilayer Ceramic Capacitor

When the dimension in the length direction L of the multilayer ceramic capacitor 1 including the laminate 10 and the external electrodes 11 and 12 is defined as an L dimension, the L dimension of the multilayer ceramic capacitor 1 is, for example, about 1.0 mm or more and about 3.2 mm or less.

When the dimension in the width direction W of the multilayer ceramic capacitor 1 including the laminate 10 and the external electrodes 11 and 12 is defined as a W dimension, the W dimension of the multilayer ceramic capacitor 1 is, for example, about 0.5 mm or more and about 1.6 mm or less.

When the dimension in the lamination direction T of the multilayer ceramic capacitor 1 including the laminate 10 and the external electrodes 11 and 12 is defined as a T dimension, the T dimension of the multilayer ceramic capacitor 1 is, for example, about 0.5 mm or more and about 1.6 mm or less.

The L dimension of the multilayer ceramic capacitor 1 may be the same as the W dimension or the T dimension of the multilayer ceramic capacitor 1, or may be larger than the W dimension or the T dimension of the multilayer ceramic capacitor 1, or may be smaller than the W dimension or the T dimension of the multilayer ceramic capacitor 1. The W dimension of the multilayer ceramic capacitor 1 may be the same as the T dimension of the multilayer ceramic capacitor 1, or may be larger than the T dimension of the multilayer ceramic capacitor 1, or may be smaller than the T dimension of the multilayer ceramic capacitor 1.

Usually, these dimensions are numerical values not including tolerances, but in the present specification, dimensions including tolerances are also within the scope of the present invention.

The thickness of each of the plurality of dielectric layers 20 and the plurality of internal electrode layers 30 is measured as follows. First, a WT cross section of the laminate 10 exposed by polishing is observed with a scanning electron microscope. Subsequently, the thickness is measured on a total of five lines including a center line along the lamination direction T passing through the center of the WT cross section of the laminate 10 and lines drawn two by two at equal or substantially equal intervals on both sides from the center line. The average value of the five measured values is defined as the thickness of each layer. In order to obtain a more accurate thickness, the five measured values are obtained for each of the upper portion, the central portion, and the lower portion in the lamination direction T, and the average value of these measured values is defined as the thickness of each layer.

Method for Producing Multilayer Ceramic Capacitor

The multilayer ceramic capacitor of the present example embodiment is preferably produced by the following method, for example.

(1) A dielectric sheet and a conductive paste for an internal electrode are prepared. The dielectric sheet and the conductive paste for an internal electrode include a binder and a solvent, and a known organic binder and an organic solvent can be used.

(2) The conductive paste for an internal electrode is printed on the dielectric sheet in a predetermined pattern by a method such as, for example, screen printing or gravure printing to form an internal electrode pattern.

(3) A predetermined number of dielectric sheets for an outer layer on which the internal electrode pattern is not printed are laminated, dielectric sheets on which the internal electrode pattern is printed are sequentially laminated thereon, and a predetermined number of dielectric sheets for an outer layer are laminated thereon, thus preparing a laminated sheet.

(4) The laminated sheet is pressed in the lamination direction by a method such as, for example, a hydrostatic press to prepare a laminated block. Pressing is not essential.

The steps (1) to (4) are repeated to prepare a plurality of laminated blocks. At that time, it is preferable to laminate a plurality of dielectric sheets alone in advance as outer layers above and below the laminated block because handling becomes easy in the subsequent step.

The distortion of each laminated block is measured, and the laminated blocks are stacked so that the overall distortion is minimized, and then pressed. At the time of stacking, it is preferable to shift the blocks by a certain distance so as to increase the reliability.

In order to improve adhesiveness, a dielectric sheet including a large amount of a binder may be disposed between laminated blocks.

(5) The laminated blocks are cut into a predetermined size, and a laminated chip is cut out. At this time, the corner portions and the ridge portions of the laminated chip may be rounded by a method such as barrel polishing, for example.

(6) The laminated chip is fired to prepare a laminate. The firing temperature depends on the materials of the dielectric layer and the internal electrode layer, but is, for example, preferably about 900° C. or higher and about 1,300° C. or lower.

In the case where external electrode is baked layer:

(7) A conductive paste for an external electrode is applied to both end surfaces of the laminate, and then baked to form a baked layer of an external electrode. The baking temperature is, for example, preferably about 700° C. or higher and about 900° C. or lower.

(8) If necessary, the surface of the baked layer may be subjected to a plating treatment.

In the case where external electrode is plated electrode:

A plated electrode may be formed directly on the surface of the laminate without providing a baked layer as an external electrode. In that case, the following steps (7') and (8') are performed in place of the steps (7) and (8).

(7') Both end surfaces of the laminate are subjected to a plating treatment to form a base plating layer on the exposed portion of the internal electrode layer. In performing the plating treatment, for example, either electroplating or electroless plating may be used, but in the electroless plating, a pretreatment with a catalyst or the like is required in order to improve the plating deposition rate, and there is a disadvantage that the process becomes complicated. Therefore, it is usually preferable to adopt electroplating. As the plating method, barrel plating is preferably used.

(8') If necessary, the surface of the plating layer may be further subjected to a plating treatment.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
a laminate including a plurality of dielectric layers and a plurality of internal electrode layers laminated in a lamination direction, a first main surface and a second main surface facing each other in the lamination direction, a first side surface and a second side surface facing each other in a width direction orthogonal or substantially orthogonal to the lamination direction, and a first end surface and a second end surface facing each other in a length direction orthogonal or substantially orthogonal to the lamination direction and the width direction; and
a pair of external electrodes covering the first end surface and the second end surface of the laminate, respectively, and connected to the plurality of internal electrode layers; wherein
the plurality of internal electrode layers are divided into M (M is a natural number of 2 or more) groups;
the M groups each independently include N (N is a natural number of 2 or more) internal electrode layers continuously in the lamination direction;
a total number of internal electrode layers included in the first to M-th groups is 1,000 or more;
a thickness of the dielectric layer is about 0.8 μm or more;
when a cross section including the width direction and the lamination direction at a central portion in the length direction in the laminate is viewed, in at least one set of an m-th (m is a natural number of 1 or more and M−1 or less) group and an (m+1)-th group, a deviation amount in the width direction between an n-th (n is a natural number of 1 or more and N−1 or less) internal electrode layer and an (n+1)-th internal electrode layer is within α1 and when a deviation amount in the width direction of the internal electrode layers adjacent to each other in the lamination direction between the m-th group and the (m+1)-th group is denoted by β1, α1<β1 is satisfied; and
when a cross section including the length direction and the lamination direction at a central portion in the width direction in the laminate is viewed, in the m-th group and the (m+1)-th group, a deviation amount in the length direction of the end portions not connected to the external electrode of the internal electrode layers connected to the same external electrode is within α2 and when a deviation amount in the length direction of the end portions not connected to the external electrode of the internal electrode layers closest to each other and connected to the same external electrode between the m-th group and the (m+1)-th group is denoted by β2, α2<β2 is satisfied.

2. The multilayer ceramic capacitor according to claim 1, wherein, in the m-th group, at least one of an end portion in the width direction or an end portion in the length direction of the internal electrode layers is curved in a same direction of the lamination direction.

3. The multilayer ceramic capacitor according to claim 2, wherein, in the (m+1)-th group, at least one of an end portion in the width direction or an end portion in the length direction of the internal electrode layers is curved in a same direction of the lamination direction; and
the directions in which the end portions of the internal electrode layers are curved are the same between the m-th group and the (m+1)-th group.

4. The multilayer ceramic capacitor according to claim 2, wherein, in the (m+1)-th group, at least one of an end portion in the width direction or an end portion in the length direction of the internal electrode layer is curved in a same direction of the lamination direction; and
the directions in which the end portions of the internal electrode layers are curved are different between the m-th group and the (m+1)-th group.

5. The multilayer ceramic capacitor according to claim 1, wherein, when a distance between the internal electrode layers in the m-th group is denoted by t1, and a distance between the internal electrode layers in between the m-th group and the (m+1)-th group is denoted by t2, t1<t2 is satisfied.

6. The multilayer ceramic capacitor according to claim 5, wherein the distance t1 is about 0.8 μm or more and about 1.2 μm or less.

7. The multilayer ceramic capacitor according to claim 5, wherein the distance t2 is about 1.2 μm or more and about 5 μm or less.

8. The multilayer ceramic capacitor according to claim 1, wherein, when a number of internal electrode layers included in the m-th group is denoted by N1 and a number of internal electrode layers included in the (m+1)-th group is denoted by N2, N1 and N2 are different.

9. The multilayer ceramic capacitor according to claim 1, wherein, when a cross section including the length direction and the lamination direction at a central portion in the width direction in the laminate is viewed, the internal electrode layers closest to each other between the m-th group and the (m+1)-th group are connected to the same external electrode.

10. The multilayer ceramic capacitor according to claim 1, wherein at least one of a corner portion and a ridge portion of the laminate is rounded.

11. The multilayer ceramic capacitor according to claim 1, wherein a number of the plurality of dielectric layers is 1,000 or more.

12. The multilayer ceramic capacitor according to claim 1, wherein each of the plurality of dielectric layers includes $BaTiO_3$ or $SrTiO_3$ as a main component.

13. The multilayer ceramic capacitor according to claim 12, wherein each of the plurality of dielectric layers includes a Mn compound, an Fe compound, a Cr compound, a Co compound, or a Ni compound as a subcomponent.

14. The multilayer ceramic capacitor according to claim 1, wherein the deviation amount $\alpha 1$ is about 0 $\mu$m or more and about 20 $\mu$m or less.

15. The multilayer ceramic capacitor according to claim 1, wherein the deviation amount $\beta 1$ is about 100 $\mu$m or more and about 500 $\mu$m or less.

16. The multilayer ceramic capacitor according to claim 1, wherein the deviation amount $\alpha 2$ is about 0 $\mu$m or more and about 20 $\mu$m or less.

17. The multilayer ceramic capacitor according to claim 1, wherein the deviation amount $\beta 2$ is about 100 $\mu$m or more and about 500 $\mu$m or less.

18. The multilayer ceramic capacitor according to claim 1, wherein each of the external electrodes extends to the first main surface, the second main surface, the first side surface, and the second side surface.

19. The multilayer ceramic capacitor according to claim 1, wherein each of the external electrodes includes a base electrode layer and a plating layer on the base electrode layer.

20. The multilayer ceramic capacitor according to claim 19, wherein the base electrode layer is a baked layer.

\* \* \* \* \*